March 12, 1929.   E. L. GRAUEL   1,704,939
ECCENTRIC BUSHING
Filed Nov. 3, 1924
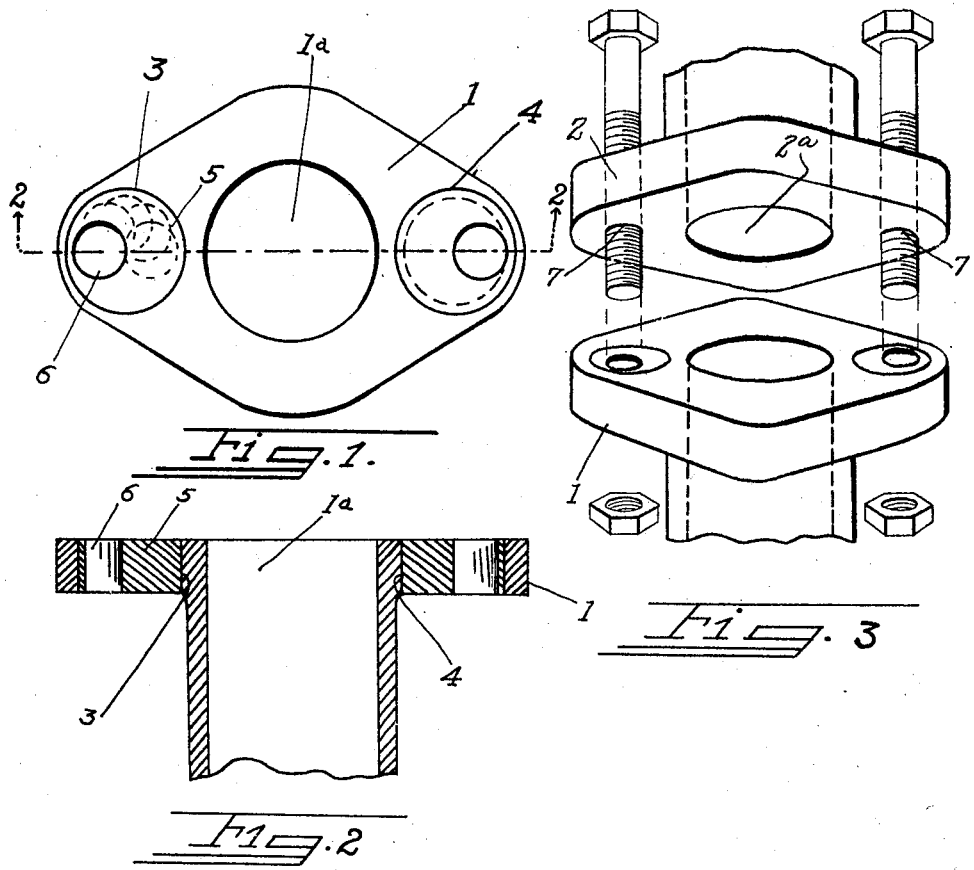
INVENTOR
Edwin L. Grauel
BY
ATTORNEYS Patented Mar. 12, 1929.

1,704,939

UNITED STATES PATENT OFFICE.

EDWIN L. GRAUEL, OF CINCINNATI, OHIO, ASSIGNOR TO THE GRAULOCK COMPANY, OF CINCINNATI, OHIO, A CORPORATION OF OHIO.

ECCENTRIC BUSHING.

Application filed November 3, 1924. Serial No. 747,488.

My invention relates to devices for providing suitable bolt or pin holes by means of which several pieces can be secured together with proper registry, where permanent holes in one piece are spaced arbitrarily, and must be fitted by the holes in the other pieces to be attached thereto.

Among other industrial uses of my invention, I refer principally to the automobile in which the carbureter is made by one concern, and the manifold by another, and also to instances where it is desired to insert between the bolt receiving flanges of two automobile engine parts, an additional part, which must register as to its orifice with the engine parts between which it is placed.

In the instances which I have just recited, within my own experience, it is very troublesome to fit the flanges to be bolted together, so far as their bolt holes are concerned. The bolt holes in the manifold flange may be two and three sixteenths inches apart from center to center, and the carbureter may be two inches. To make a fit, it is required to drill out larger holes in one part or the other, and get the drilled holes properly placed. My invention entirely avoids this work, by the provision of a bushing which revolves around in largely oversized holes in the flanges of such parts, with a bolt hole of standard dimensions in the bushings.

Although at first glance it would appear that in the specific instance mentioned, that improper registry of the passageways through the several parts would result, the devices work out for a perfect registry, since the eccentric bushings, as I have termed them, because the holes are bored out of center thereof, will so adjust themselves automatically, as to swing the outer portions of the two flanges around the centers thereof, as a pivot point, thereby preserving the centers in perfect registry. Furthermore, the edges of the flanges will not be out of alignment with each other except for a very slight distance.

I accomplish my object by that certain construction and arrangement of parts to be hereinafter more specifically pointed out and claimed.

In the drawing:

Figure 1 is a plan view of a flange fitted up with my bushings.

Figure 2 is a section on the line 2—2 of Figure 1.

Figure 3 is a perspective of two flanges with my bushings in one of them.

It will be understood that I have arbitrarily selected for the purpose of illustrating my invention, the flanges 1 and 2 of parts to be connected, which flanges have a central portion, in this instance a passageway 1ª and 2ª in each, which passageways are to be centered and aligned with each other.

In the flange 1, equally spaced from the center of the device are two large holes 3 and 4, in which the bushings are arranged. The bushings are alike, having bodies 5 and holes 6 therein set eccentrically and alike in each body.

The bushings are rotatable in the holes, and the bolt holes 6 therein will be of a size to fit the standard bolts used in the particular devices in question.

In assembling the devices they will be set together, and a suitable pin used to rotate the bushings around until the bolt holes therein register with the bolt holes 7 in the flange 2.

The bolts are then set through the aligned holes and tightened down in place.

By examination of Figure 2, it will be noted that when the bushing at the left hand side is swung counterclockwise, that the bushing at the right hand side is swung clockwise. This will shift the one end of the flange to the right by a maximum distance equal to the radius from the center of the bushing to the center of the bolt holes. It will swing the other end of the flange a like distance in the opposite direction. The central portions of the two bushings will thus remain in registry, in the same manner, as if the two holes 1ª and 2ª were filled with a rod which fit them, and the parts revolved on this rod.

Not only will this occur, but the bushings will naturally arrange themselves in this way, if one is pushed clockwise and one counterclockwise.

It will be thus evident that the parts can be bolted together tightly, gaskets protecting the holes can be inserted and held in place and the holes will be fully aligned with each other. It will also be evident that the utmost lateral shift of the ends of the flanges will be only one quarter of the utmost range of adjustablity of the bolt holes 6 in the bushings.

Having thus described my invention by a specific application thereof, from which its adaptation to various mechanical elements will be evident to those skilled in the arts involved, what I claim as new and desire to secure by Letters Patent, is:—

In a coupling, the combination of two members having central orifices to be matched with each other, and flanges to be bolted together, the one member having bolt holes in its flange spaced equally and diametrically with relation to the orifice, and the other member having larger holes therein also equally spaced and bushings revoluble in said larger holes, said bushings having eccentric bolt holes therethrough, and bolts adapted to be inserted in said bolt holes, whereby said members, after roughly adjusting the orifices to registry, may be secured together with the orifices of the two members in registry with each other.

EDWIN L. GRAUEL.